March 22, 1966     A. SABATINO     3,242,012
STORAGE BATTERY CONSTRUCTION
Filed June 3, 1963
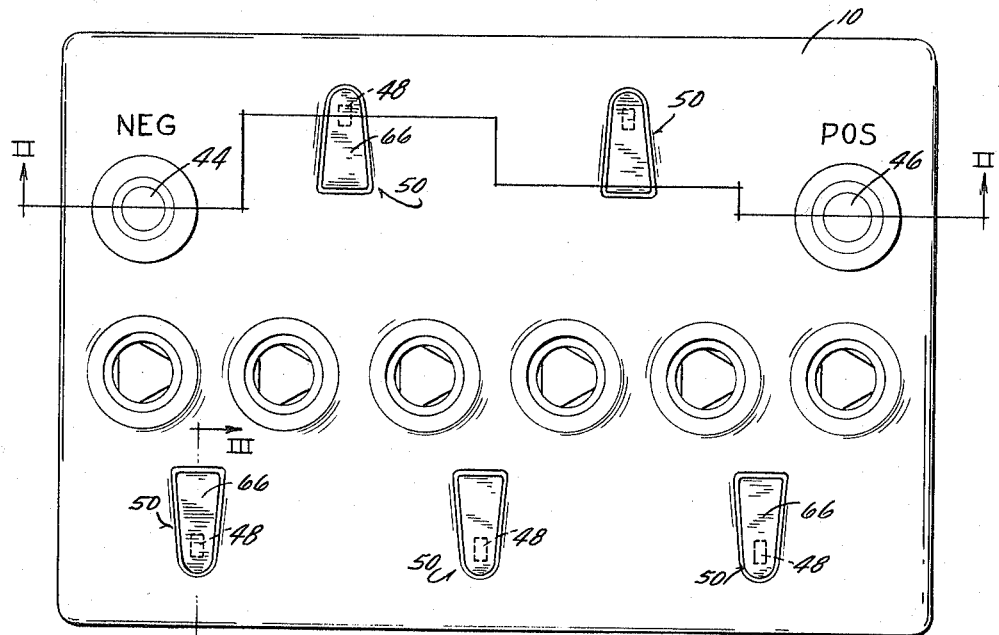
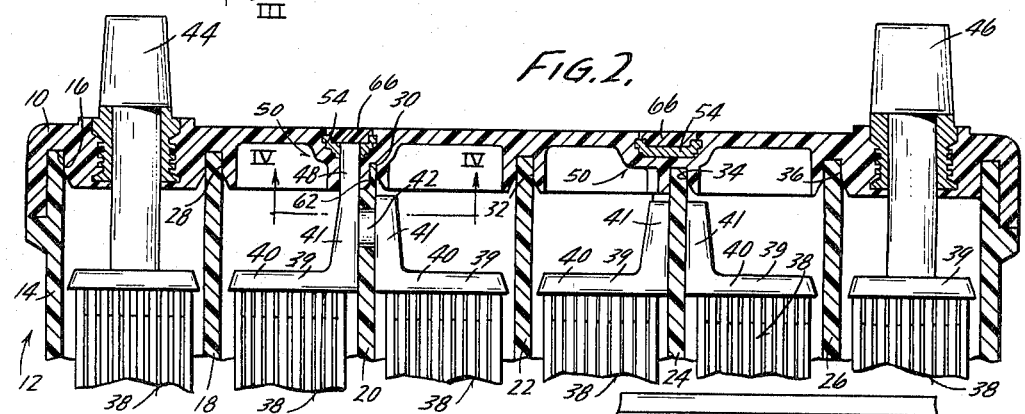
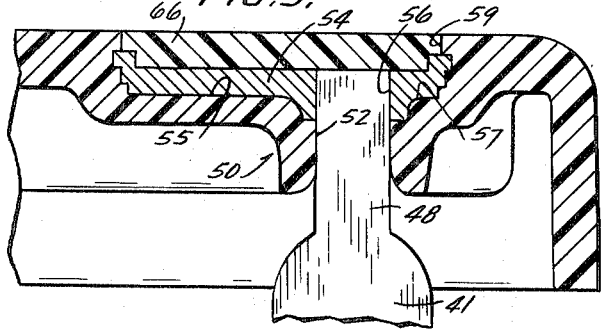
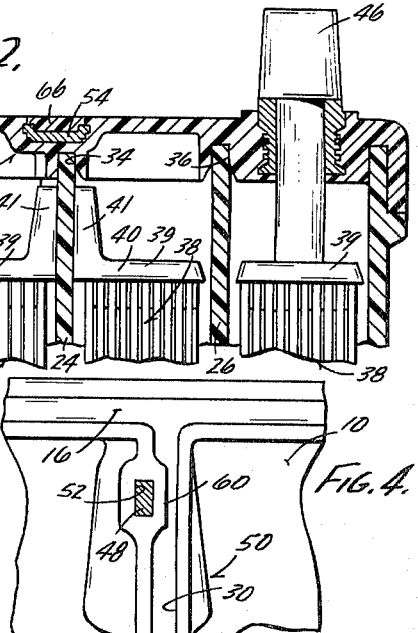
INVENTOR.
ANTHONY SABATINO
BY
Gerrit _____
ATTORNEY.

United States Patent Office 3,242,012
Patented Mar. 22, 1966

3,242,012
STORAGE BATTERY CONSTRUCTION
Anthony Sabatino, Milwaukee, Wis., assignor to Globe-Union Inc., Milwaukee, Wis., a corporation of Delaware
Filed June 3, 1963, Ser. No. 284,882
12 Claims. (Cl. 136—134)

This invention relates to electric storage batteries wherein the intercell connections are located wholly within the battery and, more particularly, to the electrical testing of individual cells of batteries having such a construction.

Although this invention is generally applicable to batteries including internal intercell connections of any type, it is disclosed and will be described as embodied in a battery including an internal intercell connection of the type disclosed and claimed in the co-pending U.S. patent applications of Anthony Sabatino and Daniel Orlando, namely Serial No. 132,660, filed August 31, 1961 and entitled "Storage Battery Construction and Method of Making Same" and, a divisional and continuation-in-part of that application, Serial No. 214,083, filed August 1, 1962 and entitled "Storage Battery Construction," both applications being assigned to the assignee of this invention. Generally, such an intercell connection comprises a fused, or welded, joint between the conductive straps of adjacent battery cells and extending through the battery partition walls. Such a construction exhibits the well recognized advantages of generally improving the battery operating characteristics, reducing internal resistance, eliminating various corrosion problems, offering increased available power output without increasing battery size and affording a smooth, clean outer battery housing. However, such constructions present a problem in that the conductive cell straps, being located within the battery, are not readily accessible for electrically testing individual cells.

Accordingly, an object of this invention is to provide for ready and convenient electrical testing of the individual cells of a battery having a construction wherein the intercell connections are located wholly within the battery.

Another object of this invention is to achieve the above stated object while maintaining the simplicity of design and ease of assembly which is achieved by such an intercell construction and, moreover, to do so without disturbing the sealed nature of the battery construction.

For the achievement of these and other objects, this invention contemplates a battery construction wherein the conductive straps of the battery cells, which are internally connected, include conductive lugs arranged for connection with a test probe exteriorly of the battery. Preferably, this connection is through the battery cover which is provided with contact pads arranged for electrical connection with the conductive lugs. The contact pads are suitably mounted in the cover to achieve a sealed connection therewith, e.g. by being molded in the cover, and are then fused with the conductive lugs to provide an exposed testing terminal having a sealed connection with the cover. If desired, the contact pads can be molded into suitable recesses in the cover and a suitable plastic coating may be applied over the conductive lugs to insure both a sealed connection and a smooth, clean cover.

Other objects and advantages will be pointed out in, or be apparent from, the description and claims, as will obvious modifications of the embodiment shown in the drawing, in which:

FIG. 1 is a top plan view of a battery constructed in accordance with this invention;

FIG. 2 is a section view generally along lines II—II of FIG. 1 and illustrating the cover as mounted on a battery case;

FIG. 3 is a section view generally along lines III—III of FIG. 1; and

FIG. 4 is a section view generally along lines IV—IV of FIG. 2, without the battery case.

With particular reference to the drawing, the battery includes a cover 10 and a case 12, the cover being assembled onto the case by positioning the upper end of the battery case walls 14 in a groove 16 which extends around the periphery of the cover and includes a suitable adhesive cement (not shown) to provide a sealed connection. Partition walls 18, 20, 22, 24 and 26 are received in grooves 28, 30, 32, 34 and 36 in the battery cover 10 and divide the interior of the battery into separate compartments. A cell assembly 38 is positioned in each of the compartments. The battery cells are constructed in a manner well known in the art and each comprises negative and positive battery plates supported by a pair of relatively spaced conductive battery straps 40, one strap being connected to the negative plates and the other to the positive plates. The conductive straps 40 can be connected to the battery plates in any suitable manner, preferably they are cast-on as taught and claimed in U.S. Patent No. 3,087,005 granted April 23, 1963 to Anthony Sabatino and Paul D. Lowe entitled "Method of Making Storage Battery Elements," and assigned to the assignee of this application. The positive strap of one cell assembly is connected to the negative strap of the adjacent cell assembly by an intercell connection 42 extending through the partition walls. The intercell connnection used is preferably that which is taught in the above identified applications of Anthony Sabatino and Daniel Orlando, Serial Nos. 214,083 and 132,660 and reliance is placed on those applications for a more complete description of the connection and the method of forming the connection. A negative battery terminal 44 is connected to one of the end cell assemblies, and a positive terminal 46 is connected to the cell assembly located at the opposite end of the battery.

With the type of battery construction described to this point, the conductive elements of the various cells are positioned wholly within the battery structure where they are generally inaccessible for electrical testing of individual cells after assembly of cover 10 onto the case. As a solution to this problem, this invention proposes to provide an arrangement wherein portions of the battery straps 40 extend exteriorly of the battery to be readily accessible for testing. More particularly, each of the straps 40 are one-piece members including a plate supporting portion 39 and an intercell connecting portion 41, and at least one of the straps 40 of each of the cells includes a conductive lug 48, preferably integrally molded on the strap, extending from intercell connecting portion 41 toward the cover. The battery cover is provided with boss 50 positioned adjacent each of the intercell connections and including an opening 52 for receipt of lugs 48. Lugs 48 extend through openings 52 for exposure exteriorly of the battery for engagement by a suitable test probe, not shown. It will be noted in FIG. 4, that bosses 50 include a portion 60 extending into the battery cover grooves. To accommodate the extensions 60, the partition walls are provided with indentations 62 positioned to receive the extensions. It will be appreciated that the mating projections and indentations in the battery cover and partitions walls also serve to properly position the cover on the battery case.

Although exposure of the upper end of lug 48 may, in some applications, be adequate for engagement by the test probe, it is preferred to further facilitate the testing procedure by providing a contact pad 54 in the battery cover and to electrically connect the lugs 48 to the contact pads. More particularly, contact pads 54 take the form of generally wedge-shaped inserts molded into the cover 10 adjacent bosses 50 and include an aperture 56 in alignment with opening 52 of the bosses. The lugs 48 extend into apertures 56 and, when positioned therein, the lugs are fused to the contact pads, at this point it should be noted that straps 40 are usually made of lead and contact pads 54 are also of the same material, lead, but other materials can be used for both elements. The combination contact pad and lug provides a broad test terminal for facile and convenient engagement by a test probe. Molding the contact pads into the cover provides a sealed connection, however, it will be appreciated that other arrangements can be used so long as a sealed connection of the contact pads to the cover is maintained.

As shown in FIG. 3, contact pads 54 are molded in a recess 55 in the battery cover and its peripheral edge 57 has a stepped configuration and its upper surface is engaged by a molded inwardly directed flange 59 so that an interlocking engagement between the cover and contact pad is provided. It will be appreciated that the contact pad could be left uncovered and directly exposed; however, it is preferred that the recess be subsequently filled with a suitable plastic material 66. This particular arrangement has the desirable advantage of insuring a sealed connection at the testing terminal providing a smooth, clear cover and, also providing corrosion protection for the contact pads. The contact pads and lugs are still, for all practical purposes, exposed for engagement by a suitable test probe as the plastic layer 66 is relatively thin and a pointed probe (not shown) can be easily inserted through the plastic for engagement with the contact pad or the lug.

In assembly, the battery cover is placed on case 12 with conductive lugs 48 extending through openings 52 and 56. With the lugs positioned in the contact pad openings, heat is applied and the lug and pad are welded to provide a fused electrical and mechanical joint. Furthermore, the formation of the fused, or welded, joint seals the opening to thereby preserve a sealed battery construction.

After the weld connection between the lugs and the contact pads has been made, the portion of recesser 55 above the pads is filled with plastic material 66 to the upper level of the cover. With the plastic material, the testing terminals, contact pad and lugs are still readily accessible for electrical engagement by a test probe. This construction then provides the particular advantage of facilitating electrical testing of individual cells while maintaining a sealed battery construction.

Although this invention has been illustrated and described in connection with a particular embodiment thereof, it will be apparent to those skilled in the art that various changes and modifications may be made therein without departing from the spirit of the invention or from the scope of the appended claims.

What I claim is:

1. A storage battery comprising, in combination,
   a case having an outer wall portion and a plurality of relatively spaced partition walls arranged within said battery and cooperating with said outer case wall to define a plurality of cell assembly compartments,
   means defining an aperture through each of said partition walls,
   a cover on said case,
   a plurality of cell assemblies each including conductive strap portions and said cell assemblies arranged one within each of said compartments with the conductive strap portions thereof disposed adjacent an aperture in respective ones of said partition walls,
   means extending through said apertures and electrically and mechanically connecting conductive strap portions of adjacent cell assemblies and forming an intercell connection independently of said cover,
   a generally elongated lug formed integrally with at least one of the conductive strap portions at each of said intercell connections and extending from said conductive strap portions in a direction parallel to said partition walls and toward said cover, said lugs being characterized by a given, relatively small area in transverse cross section,
   means defining an aperture in said cover adjacent each of said intercell connections and aligned with said lugs for receiving a respective one of said lugs,
   and an electrically conductive member molded in and having an interlocking fit with said cover adjacent each of said cover apertures, said electrically conductive members being in engagement with an electrically connected to a respective one of said lugs, said conductive members characterized by having an area in a direction parallel to said given transverse lug cross sectional area of said lug which is substantially larger than said given transverse cross sectional area and being connected to said cell assemblies only through said lug to render said cell assemblies readily accessible from exteriorly of said battery for electrically testing individual cell assemblies.

2. The combination of claim 1 wherein each of said electrically conductive members include an opening registering with said cover apertures and said lugs extend into said openings.

3. The combination of claim 1 wherein said conductive members are connected to said lugs by a fused connection so that a sealed electrical joint is provided at the juncture of said lugs with said conductive members.

4. The combination of claim 1 wherein said conductive members are molded in a recess in said cover and are disposed below the outer surface of said cover, and including a plastic material filling the recess above said conductive members.

5. The combination of claim 1 wherein said lugs include a planar face disposed in flatwise engagement with and extending along a portion of said partition walls.

6. The combination of claim 1 wherein said means defining said aperture further defines a generally annular portion extending from the innerside of said cover for receipt of said lugs, said lugs intimately engaging the inner walls of said annular projection to provide a seal.

7. The combination of claim 6 wherein the partition walls are provided with means defining a notch in the walls adjacent each of the intercell connections and arranged to receive and interfit with a respective one of said annular projections.

8. A storage battery comprising, in combination,
   a case having an outer wall portion and relatively spaced partition wall arranged within said case and cooperating with said outer wall portion to define a plurality of cell compartments,
   a cover on said case,
   a plurality of cell assemblies each including conductive strap portions and said cell assemblies arranged one within each of said compartments with the conductive strap portions thereof disposed adjacent respective ones of said partition walls,
   means extending through said partition walls and electrically and mechanically connecting conductive strap portions of adjacent cell assemblies and forming intercell connections independently of said cover,
   a generally elongated conductive lug electrically connected to at least one of the conductive strap portions at each of said intercell connections and extending from said conductive strap portion toward said cover, said lugs being characterized by a relatively small transverse cross sectional area,
   means defining an aperture in said cover adjacent each of said intercell connections and in alignment with said lugs for receiving a respective one of said lugs, and an electrically conductive member sealingly mounted in said cover adjacent each of said cover apertures and being in engagement with and electrically connected to respective ones of said lugs, said conductive members characterized by having a cross sectional area in a direction parallel to said transverse lug cross sectional area which is relatively larger than said transverse lug cross sectional area and being electrically connected to said cell assemblies only through said lugs to render said cell assemblies readily accessible from exteriorly of said housing for testing individual cell assemblies.

9. The combination of claim 8 wherein said lugs are fused to said conductive members to provide a sealed joint therebetween.

10. A storage battery comprising, in combination,
a case having outer wall portions and a plurality of relatively spaced partition walls arranged within said case and cooperating with said outer case wall portions to define a plurality of cell assembly compartments,
a cover on said case,
a plurality of cell assemblies each including conductive strap portions and said cell assemblies arranged one within each of said compartments with the conductive strap portions thereof disposed adjacent respective ones of said partition walls,
means extending through said partition walls and electrically connecting conductive strap portions of adjacent cell assemblies independently of said cover,
a conductive lug electrically connected to at least one of the conductive strap portions at each intercell connection and extending from said conductive strap portions toward said cover,
and a plurality of conductive means sealingly mounted in said cover adjacent each of said intercell connections and in engagement with and electrically connected to respective ones of said lugs, said means extending generally transversely of the direction of extension of said lugs to render said cell assemblies readily accessible from exteriorly of said battery for testing individual cell assemblies.

11. A storage battery comprising, in combination,
a case having an outer wall portion and a plurality of relatively spaced partition walls arranged within said case and cooperating with said outer wall portion to define a plurality of cell compartments,
a cover on said case,
a plurality of cell assemblies each including a conductive strap portion and arranged one within each of said compartments,
means extending through said partition wall and electrically and mechanically connecting the conductive strap portions of adjacent cell assemblies to form intercell connections,
at least one of the conductive strap portions at each intercell connection including an integral conductive portion extending toward said cover,
means defining an aperture in said cover adjacent each of said intercell connections and in alignment with said integral portions for receiving a respective one of said integral portions,
and means connected to said cover at each of said cover apertures and being in engagement with and electrically connected to said integral portions to render said cell assemblies readily accessible from exteriorly of said battery for electrically testing individual cell assemblies.

12. A storage battery comprising, in combination,
a cover,
a case having an outer wall portion and relatively spaced partition walls arranged within said case and cooperating with said outer wall portion to define a plurality of cell compartments,
a plurality of cell assemblies arranged one within each of said compartments and said cell assemblies including conductive strap portions,
means extending through said partition walls and electrically and mechanically connecting adjacent ones of said cell assemblies to form an intercell connection,
at least one of the conductive strap portions at each intercell connection including an integral conductive portion extending toward said cover,
and conductive means in said cover in engagement with and electrically connected to each of said integral portions and providing for electrical connection to said cell assemblies through said integral portions from exteriorly of said cover and case so that individual cell assemblies can be electrically tested.

References Cited by the Examiner
UNITED STATES PATENTS

| | | | |
|---|---|---|---|
| 1,980,903 | 11/1934 | Blake | 136—134 |
| 2,057,729 | 10/1936 | Mayer | 136—134 |
| 3,075,036 | 1/1963 | Shank et al. | 136—134 |

WINSTON A. DOUGLAS, *Primary Examiner.*

JOHN H. MACK, *Examiner.*